(12) United States Patent
Dosi et al.

(10) Patent No.: US 10,529,034 B2
(45) Date of Patent: Jan. 7, 2020

(54) SYSTEMS AND METHODS FOR DETERMINING PAGE IDENTIFIERS

(71) Applicant: Facebook, Inc., Menlo Park, CA (US)

(72) Inventors: Gaurav Dosi, Emeryville, CA (US); Matthew Eric Lanter, San Francisco, CA (US); Gina Marie Rodriguez, Berkeley, CA (US); Andrea Bich Lan Nguyen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 171 days.

(21) Appl. No.: 15/356,470

(22) Filed: Nov. 18, 2016

(65) Prior Publication Data

US 2018/0146063 A1    May 24, 2018

(51) Int. Cl.
*H04L 29/08*   (2006.01)
*G06Q 50/00*   (2012.01)

(52) U.S. Cl.
CPC .............. *G06Q 50/01* (2013.01); *H04L 67/02* (2013.01); *H04L 67/18* (2013.01)

(58) Field of Classification Search
CPC ....... H04L 67/306; H04L 67/18; H04L 67/02; H04L 50/01
USPC ........ 709/227, 228, 229, 201, 203, 225, 245
See application file for complete search history.

(56) References Cited

U.S. PATENT DOCUMENTS

| | | | | |
|---|---|---|---|---|
| 5,987,480 A * | 11/1999 | Donohue | ............... | G06Q 30/02 715/207 |
| 6,529,910 B1 * | 3/2003 | Fleskes | ............... | G06F 17/3089 707/770 |
| 6,729,543 B1 * | 5/2004 | Arons | ............... | G06F 17/30017 235/462.01 |
| 6,832,220 B1 * | 12/2004 | Rahman | ............ | G06F 17/30864 707/788 |
| 6,859,805 B1 * | 2/2005 | Rogers | ............... | G06F 21/6227 |
| 7,117,436 B1 * | 10/2006 | O'Rourke | ........... | G06F 17/3089 715/205 |
| 7,383,494 B2 * | 6/2008 | Krolczyk | ........... | H04N 1/32112 358/401 |
| 8,352,859 B2 * | 1/2013 | Zuckerberg | ........... | H04L 67/306 715/273 |
| 8,572,167 B2 * | 10/2013 | Tiu, Jr. | ................ | G06F 17/3089 709/203 |
| 9,477,984 B2 * | 10/2016 | Bennett | .................. | G06Q 30/08 |
| 9,881,258 B1 * | 1/2018 | Mopuru | ................ | G06Q 10/00 |
| 9,953,302 B2 * | 4/2018 | Hull | ...................... | G06Q 10/107 |
| 2002/0004813 A1 * | 1/2002 | Agrawal | ........... | G06F 17/30902 709/201 |
| 2002/0059327 A1 * | 5/2002 | Starkey | ............. | G06F 17/30893 |
| 2002/0103902 A1 * | 8/2002 | Nagel | ............... | G06F 17/30861 709/225 |
| 2010/0280860 A1 * | 11/2010 | Iskold | .................... | G06Q 10/00 705/319 |
| 2010/0299325 A1 * | 11/2010 | Tzvi | .................... | G06F 17/2247 707/728 |

(Continued)

*Primary Examiner* — Frantz Coby

(74) *Attorney, Agent, or Firm* — Sheppard Mullin Richter & Hampton LLP

(57) ABSTRACT

Systems, methods, and non-transitory computer-readable media can determine a request to create an identifier for a page that is accessible through a social networking system. Page data that describes the page is determined. One or more identifiers for the page are generated based at least in part on the page data.

19 Claims, 7 Drawing Sheets

(56) References Cited

U.S. PATENT DOCUMENTS

| | | | |
|---|---|---|---|
| 2011/0078156 A1* | 3/2011 | Koss | G06Q 10/04 707/748 |
| 2011/0179119 A1* | 7/2011 | Penn | G06Q 90/00 709/205 |
| 2011/0213920 A1* | 9/2011 | Frost | G06F 11/1068 711/103 |
| 2011/0258256 A1* | 10/2011 | Huberman | G06F 17/278 709/204 |
| 2014/0033078 A1* | 1/2014 | Goldman | G06Q 30/02 715/757 |
| 2015/0012514 A1* | 1/2015 | Yan | G06F 17/212 707/706 |
| 2015/0134429 A1* | 5/2015 | Katakwar | G06Q 30/0207 705/14.1 |
| 2015/0161658 A1* | 6/2015 | Little | G06Q 30/0242 705/14.45 |
| 2015/0242893 A1* | 8/2015 | Mirchandani | G06Q 30/02 705/14.53 |
| 2016/0027058 A1* | 1/2016 | Saggi | G06Q 30/0267 705/14.55 |
| 2016/0350875 A1* | 12/2016 | Deb | G06Q 50/01 |
| 2016/0371749 A1* | 12/2016 | Liu | G06Q 30/0276 |
| 2017/0185685 A1* | 6/2017 | Brewer | G06F 17/30867 |
| 2017/0353469 A1* | 12/2017 | Selekman | G06Q 50/01 |
| 2019/0073346 A1* | 3/2019 | Svendsen | G06F 17/241 |

* cited by examiner

1

SYSTEMS AND METHODS FOR DETERMINING PAGE IDENTIFIERS

FIELD OF THE INVENTION

The present technology relates to the field of content provision. More particularly, the present technology relates to techniques for generating page identifiers.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, such pages may correspond to businesses or other such entities and users of the social network can navigate to the pages to learn more about the business.

SUMMARY

Various embodiments of the present disclosure can include systems, methods, and non-transitory computer readable media configured to determine a request to create an identifier for a page that is accessible through a social networking system. Page data that describes the page is determined. One or more identifiers for the page are generated based at least in part on the page data.

In an embodiment, the systems, methods, and non-transitory computer readable media are configured to provide the one or more identifiers as suggestions to an administrator of the page.

In an embodiment, the systems, methods, and non-transitory computer readable media are configured to generate at least one identifier for the page based at least in part on one or more categories associated with the page.

In an embodiment, at least one category associated with the page is determined automatically based at least in part on data describing content that was published in the page by users of the social networking system.

In an embodiment, the systems, methods, and non-transitory computer readable media are configured to generate at least one identifier for the page based at least in part on one or more geographic locations associated with the page.

In an embodiment, a geographic location associated with the page is determined automatically based at least in part on respective geographic locations of users that liked the page.

In an embodiment, the systems, methods, and non-transitory computer readable media are configured to generate at least one identifier that includes a point of interest that is located within a threshold distance of a geographic location associated with the page.

In an embodiment, the systems, methods, and non-transitory computer readable media are configured to generate at least one identifier that includes at least a portion of a street address that corresponds to a geographic location associated with the page.

In an embodiment, the systems, methods, and non-transitory computer readable media are configured to determine that the page corresponds to a first company branch of a plurality of company branches, obtain company data that references internal names for the company branches, and generate at least one identifier for the page that includes a corresponding internal name for the first company branch.

In an embodiment, the systems, methods, and non-transitory computer readable media are configured to determine that at least one of the identifiers for the page are available in one or more platforms other than the social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
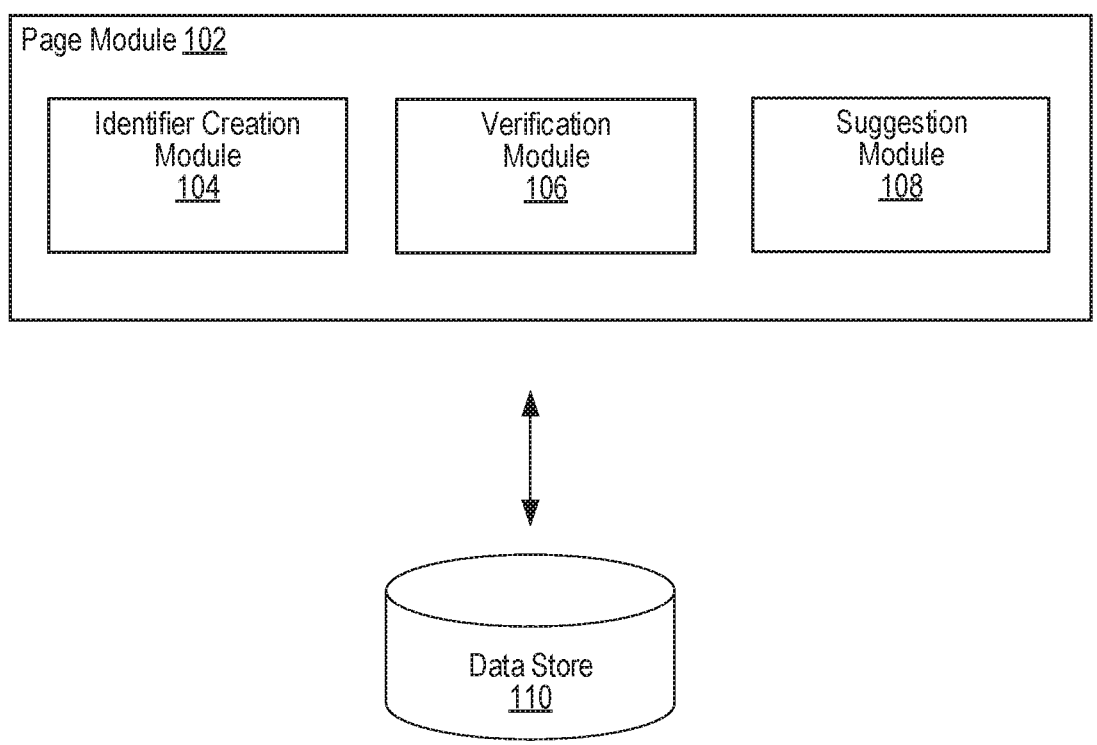
FIG. 1 illustrates an example system including a page module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Determining Page Identifiers

People often utilize computing devices (or systems) for a wide variety of purposes. Users can use their computing devices to, for example, interact with one another, access content, share content, and create content. In some instances, users can interact with content that is published through a social networking system. Such content can include content items (e.g., images, videos, etc.), posts (e.g., text and media content items, such as images, videos, and audio), and pages.

Under conventional approaches, a user may navigate to or be presented with various pages in the social networking system. In some instances, a page may correspond to an entity (e.g., an organization, a business, a celebrity, etc.). In general, a page can be created by a user who acts as an administrator of the page. The administrator can provide various information for the page including, for example, the page name, theme, and description, to name some examples. A user of the social networking system can search for a page corresponding to some entity through the social networking system. For example, the user can search for the page using the page's corresponding name (e.g., "Zito's Tacos"). The user can then navigate to the respective page to learn more about the entity (or organization). In some instances, there may be multiple pages that are similar to one another. For example, these pages may have similar names (e.g., "Zito's Pitas", "Tito's Tacos", etc.) that can make it difficult for the user to identify the page that is of interest. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, page identifiers (or usernames) can be used to distinguish pages. A page identifier can be a unique string of alphanumeric characters. In some embodiments, page identifiers include a symbol (e.g., the at symbol) as a prefix (or suffix). For example, the page for "Zito's Tacos" may use the identifier "@ZitosTacos". When searching for this page, a user can simply query the social networking system for the page's corresponding identifier "@ZitosTacos". For example, instead of submitting a search query that references a page's name "Zito's Tacos", which the social networking system may attempt to match against various page names and descriptions, the user can simply search for the page's identifier "@ZitosTacos". In this example, the social networking system can attempt to match the identifier "@ZitosTacos" against identifiers that are being used by other pages in the social networking system. Once a match is found, the page associated with the identifier "@ZitosTacos" can be presented to the user. Thus, in some embodiments, when a user searches for a page using a page identifier, the social networking system restricts the search to only page identifiers being used by pages in the social networking system without attempting to match the page identifier against, for example, page names or descriptions.

In some embodiments, the improved approaches can automatically suggest identifiers for pages. Unlike existing approaches which suggest identifiers (or usernames) by appending random information (e.g., numbers, letters, etc.) to the desired identifier, the improved approaches can generate identifier suggestions using information related to pages including, for example, geographic locations associated with the pages, corresponding page categories or sub-categories, and other attributes that help distinguish pages, to name some examples. Page identifiers suggested using such approaches can provide more distinctive identifier options to entities. In some embodiments, the availability of the suggested identifiers can be verified across a number of different platforms (e.g., other social networking systems) to ensure that an entity can obtain a common identifier, or identity, across the different platforms. In various embodiments, page identifiers can be used for pages that correspond to any type of entity (e.g., user, group, event, etc.).

FIG. 1 illustrates an example system 100 including an example page module 102, according to an embodiment of the present disclosure. As shown in the example of FIG. 1, the example page module 102 can include an identifier creation module 104, a verification module 106, and a suggestion module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the page module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page module 102 can be implemented, in part or in whole, as software running on one or more computing devices or systems, such as on a user or client computing device. In one example, the page module 102 or at least a portion thereof can be implemented as or within an application (e.g., app), a program, or an applet, etc., running on a user computing device or a client computing system, such as the user device 610 of FIG. 6. In another example, the page module 102 or at least a portion thereof can be implemented using one or more computing devices or systems that include one or more servers, such as network servers or cloud servers. In some instances, the page module 102 can, in part or in whole, be implemented within or configured to operate in conjunction with a social networking system (or service), such as the social networking system 630 of FIG. 6.

The page module 102 can be configured to communicate and/or operate with the at least one data store 110, as shown in the example system 100. The at least one data store 110 can be configured to store and maintain various types of page data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

In various embodiments, users (e.g., page administrators) can utilize the identifier creation module 104 to create identifiers (e.g., usernames, handles, etc.) for their respective pages in the social networking system. In some embodiments, a user can interact with the social networking system through an interface (e.g., a graphical user interface) using, for example, a software application running on a computing device. Through this interface, the user can access the social networking system and various pages that are available through the social networking system. As mentioned, a page can be associated with some entity. A page corresponding to an entity can provide users with various information about the entity. In one example, a page corresponding to an organization can include a business address, hours of operation, and/or a list of goods or services offered by the organization, to name some examples.

In some embodiments, the identifier creation module 104 can provide an interface (e.g., a graphical user interface and/or application programming interface) through which a user can request an identifier for a page. The verification module 106 can determine whether an identifier requested by the user is available for use in the social networking system. In general, the verification module 106 can determine whether the requested identifier is already in use by another page in the social networking system. For example, the user may request an identifier "@ZitosTacos" for a page. In this example, the verification module 106 can determine whether the identifier "@ZitosTacos" is available for use in the social networking system. If the identifier is available, the identifier creation module 104 associates the identifier "@ZitosTacos" with the page. Once this association is made, the identifier "@ZitosTacos" can be used to reference and locate the page in the social networking system. For example, when searching for this page, a user can submit a search query to the social networking system with the term "@ZitosTacos". In this example, the social networking system can attempt to match the term "@ZitosTacos" against identifiers for pages that exist in the social networking system. The social networking system can provide information describing the page that corresponds to the identifier "@ZitosTacos" upon identifying a match.

In some embodiments, the verification module 106 can also determine whether the requested identifier is blacklisted for use in the social networking system. In general, a blacklisted identifier is not permitted for use in the social networking system. In one example, an identifier may be blacklisted because it includes language (e.g., profanity) that is deemed inappropriate for use in the social networking system. In such embodiments, any requests for an identifier that is blacklisted are denied.

In some embodiments, the verification module 106 can be configured to determine whether the requested identifier is available for use in other platforms (e.g., other computing systems, social networking systems, etc.). For example, the verification module 106 can be configured to communicate with one or more other platforms through which identifiers can be registered. In this example, the verification module 106 can interact with the other platforms to determine whether the requested identifier is available for use in each of those platforms. For example, the verification module 106 can interact with a platform using one or more Application Programming Interfaces or by simulating a user registering for an identifier through the platform. Based on the responses received from the platforms, the verification module 106 can provide information describing the respective availability of the requested identifier in each of the other platforms. For example, the user requesting the identifier "@ZitosTacos" may want to establish an identifier that references their business in both a first social networking system and a second social networking system. In this example, the user can instruct the verification module 106 to determine whether the requested identifier "@ZitosTacos" is available for use in both the first social networking system and in the second social networking system. If the identifier "@ZitosTacos" is available in one social networking system but not the other, then the user can be notified as such and also be provided an option to submit another identifier for registration in the first and second social networking systems. In some embodiments, if the requested identifier "@ZitosTacos" is available in one or more of the multiple platforms (e.g., the first social networking system and the second social networking system), then the user can instruct the identifier creation module 104 to automatically create the requested identifier "@ZitosTacos" in those platforms.

Identifiers may be formatted differently depending on the platform. For example, one platform may use one symbol (e.g., an at sign) to signify the identifier (e.g., "@ZitosTacos") while another platform may use a different symbol (e.g., a hash) to signify the identifier (e.g., "#ZitosTacos"). In some embodiments, when querying multiple platforms, the verification module 106 can simply determine whether a unique string corresponding to the identifier (e.g., "zitotaco") is available for use while ignoring any platform-specific formatting of such identifiers.

In some instances, the user may request an identifier that is not available for use in the social networking system. In such instances, the suggestion module 108 can be configured to provide the user with one or more suggested identifiers for use. In some embodiments, suggested identifiers are also provided to the user when the user is initially creating an identifier. More details regarding the suggestion module 108 will be provided below with reference to FIG. 2.

Figure 2:
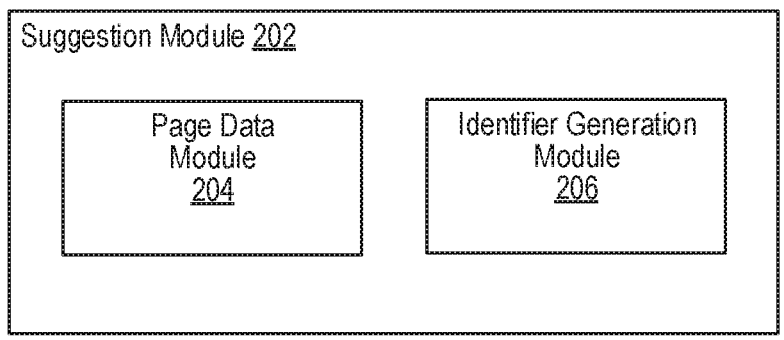
FIG. 2 illustrates an example suggestion module, according to an embodiment of the present disclosure.

FIG. 2 illustrates an example suggestion module 202, according to an embodiment of the present disclosure. In some embodiments, the suggestion module 108 of FIG. 1 can be implemented as the suggestion module 202. As shown in FIG. 2, the suggestion module 202 can include a page data module 204 and an identifier generation module 206.

As mentioned, the suggestion module 202 can be configured to provide users with one or more suggested identifiers for their respective pages. In various embodiments, when suggesting identifiers for a page, the page data module 204 can obtain data describing the page from the social networking system. Such page data can include the page's name and description, for example. In some embodiments, the page data can include one or more geographic locations that are associated with the page. For example, the entity associated with the page may be a business. In this example, the page may be associated with a geographic location that corresponds to a physical location of the business. In some embodiments, the page data can include one or more categories and/or sub-categories associated with the page. For example, a page may be associated with one or more categories and/or sub-categories that describe the page. In one example, the page "Zito's Tacos" may be associated with a "Food & Drink" category and sub-categories "Tacos", "Food Trucks", and "Late Night Eateries", to name some examples. In some embodiments, the page's categories and/or sub-categories are determined based on user feedback. For example, users of the social networking system can post content (e.g., comments, posts, media, etc.) that is published through the page. In such embodiments, content that is published through the page can be analyzed using various machine learning classifiers (e.g., topical classifiers, image classifiers, etc.) that have been trained to predict categories and/or sub-categories that describe the page. Thus, for example, a page for a bakery shop that is generally categorized in a "bakery" category may also be automatically associated with a "donuts" sub-category in view of user posts mentioning donuts that are available at the bakery shop. In some embodiments, the page data module 204 can obtain data describing user interactions with a page. For example, the page data module 204 can determine demographic information (e.g., age, gender, geographic locations, etc.) of the users that have demonstrated an interest in the page (e.g., users that have selected an option to "follow" the page and/or users like that have "liked" the page).

The data obtained by the page data module 204 can be used by the identifier generation module 206 to generate identifiers to be suggested for pages. This data can be combined in any number of ways to produce the identifiers. For example, in some embodiments, the identifier generation module 206 can generate identifiers for a page based in part on any categories and/or sub-categories associated with the page. For example, when generating identifiers for a page named "Zito's Tacos", the identifier generation module 206 can combine portions of the page's name and respective portions of any categories and/or sub-categories associated with the page. In this example, if the page is associated with the categories "Food Trucks", "Late Night Eateries" and "Churros", then the identifier generation module 206 can generate the following suggested identifiers: "@ZitosTacosFood", "@ZitosTacosTruck", "@ZitosTacosFoodTruck", "@ZitosTacosLateNight", "@ZitosTacosEatery", "@ZitosTacosLateNightEatery", and "@ZitosTacosChurros", to name some examples.

In some embodiments, the identifier generation module 206 can verify that an identifier is available for use is one or more other platforms apart from the social networking system prior to providing the identifier as a suggestion.

In some embodiments, the identifier generation module 206 can generate an identifier for a page based at least in part on a geographic location associated with the page. For example, when generating identifiers for a page named "Zito's Tacos", the identifier generation module 206 can combine portions of the page's name and the geographic location(s) associated with the page. In this example, if the page is associated with the geographic location "Berkeley, Calif.", then the identifier generation module 206 can generate the following suggested identifiers: "@ZitosTacosBerkeley", "@ZitosTacosCalifornia", "@ZitosTacosBerkeleyCA", and "@ZitosTacosBerkeleyCalifornia", to name some examples. In another example, if users that liked the page "Zito's Tacos" are located throughout the San Francisco Bay Area, the identifier generation module 206 can generate the following suggested identifiers: "@ZitosTacossf", "@ZitosTacosSanFrancisco", "@ZitosTacosSFBay", and "@ZitosTacosBayArea", to name some examples.

In some embodiments, the identifier generation module 206 can incorporate any points of interest (e.g., landmarks, parks, shopping malls, etc.) that are located within a threshold distance from a geographic location of a page. For example, if a business address of the page named "Zito's Tacos" corresponds to 30 Rockefeller Plaza, New York, N.Y., then the identifier generation module 206 can generate the following suggested identifiers: "@ZitosTacos30Rock", "@ZitosTacosNYC", and "@ZitosTacos30RockNYC", to name some examples. In another example, if a business address of the page named "Zito's Tacos" is located in or near Central Park, New York, N.Y., then the identifier generation module 206 can generate the following suggested identifiers: "@ZitosTacosCentralPark", "@ZitosTacosPark", and "@ZitosTacosCentralParkNYC", to name some examples.

In some embodiments, the identifier generation module 206 can incorporate map data (e.g., streets, roads, highways, freeways, etc.) that corresponds to a geographic location of a page. For example, if a business address of the page named "Zito's Tacos" is located on $24^{th}$ Street in San Francisco, Calif., then the identifier generation module 206 can generate the following suggested identifiers: "@ZitosTacos24th", "@ZitosTacos24thStreet", and "@ZitosTacos24thStreetSF", to name some examples.

In some instances, a company may have many franchises (or branches) that are located throughout a geographic region. For example, a company may have multiple franchises located throughout the city of San Francisco. In this example, each of these individual franchises may want to create a page identifier for their respective store. In general, the identifier generation module 206 can generate customized identifiers for these franchises using any of the approaches described above. Additionally, in some embodiments, the identifier generation module 206 can generate the identifiers by incorporating company data that references internal names for the different franchises. For example, the data for the company "Zito's Taco's" may refer to a first franchise as the "SOMA Store", a second franchise as the "Downtown Store", and a third franchise as the "Marin Store". The identifier generation module 206 can incorporate the different names used in the company data when generating identifiers for the respective franchises. For example, the identifier generation module 206 can generate the identifier "@ZitosTacosSOMA" for the first franchise, the identifier "@ZitosTacosDowntown" for the second franchise, and the identifier "@ZitosTacosMarin" for the third franchise.

Figure 3:
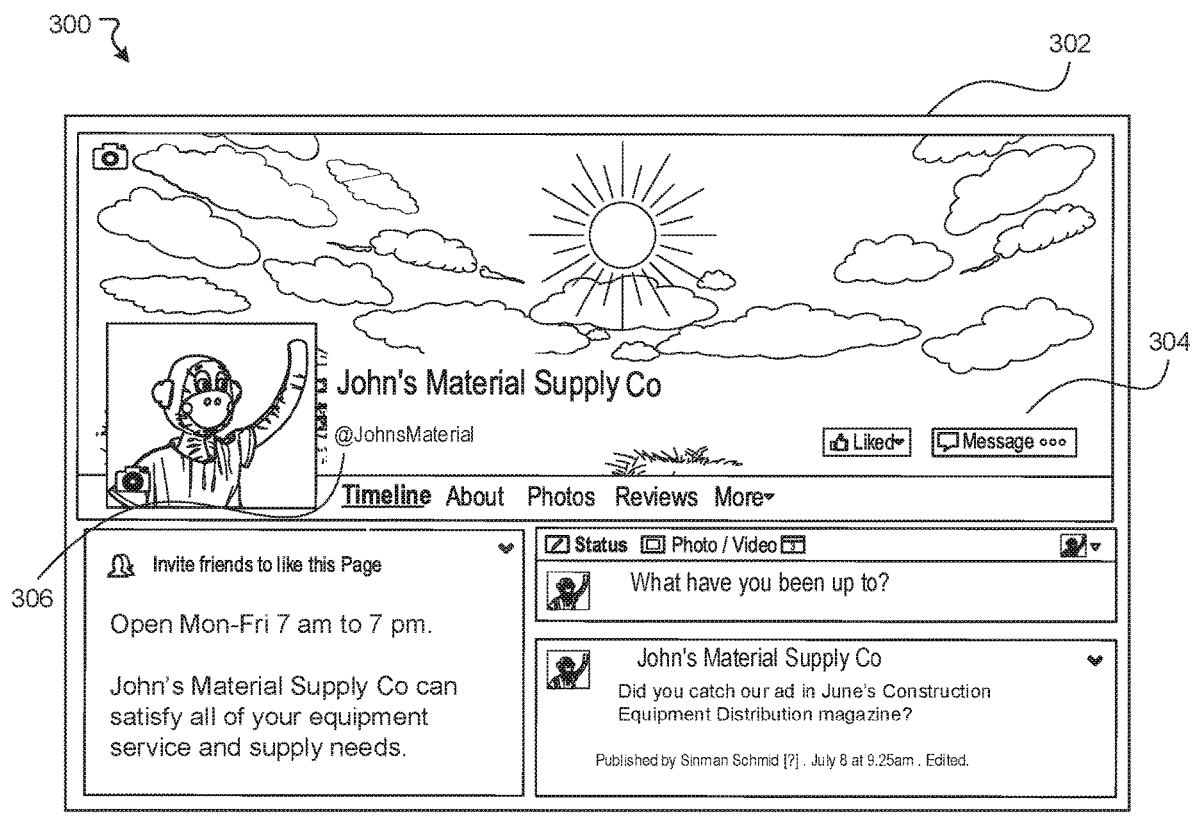
FIG. 3 illustrates an example diagram of a page, according to an embodiment of the present disclosure.

FIG. 3 illustrates an example diagram 300 of a page 302, according to an embodiment of the present disclosure. The page 302 may be presented on a display screen of a computing device. Further, the page 302 may be provided through an application (e.g., a social networking application) running on the computing device. The user operating the computing device can interact with the page 302 to access various information about the entity associated with the page (e.g., "John's Material Supply Co.") including, for example, hours of operation, menus, lists of goods and/or services offered, photos, reviews, to name some examples. The user can also select an option 304 to send messages to administrators of the page 302. In some embodiments, when the option 304 is selected, a messaging interface is presented to the user through which the user can communicate messages with an administrator of the page 302. The page 302 also indicates an identifier 306 ("@JohnsMaterial") that corresponds to the page 302. As mentioned, this identifier can be used to easily reference and locate the page 302 through the social networking system. In some embodiments, the identifier 306 can be used in a Uniform Resource Locator (URL) that directs to the page 302 (e.g., http://www.example.com/JohnsMaterial). In some embodiments, in addition to being used in a URL, the identifier 306 can also be provided as a machine-readable code (e.g., QR code, Messenger codes, or any type of code that can be scanned using a computing device).

Figure 4:
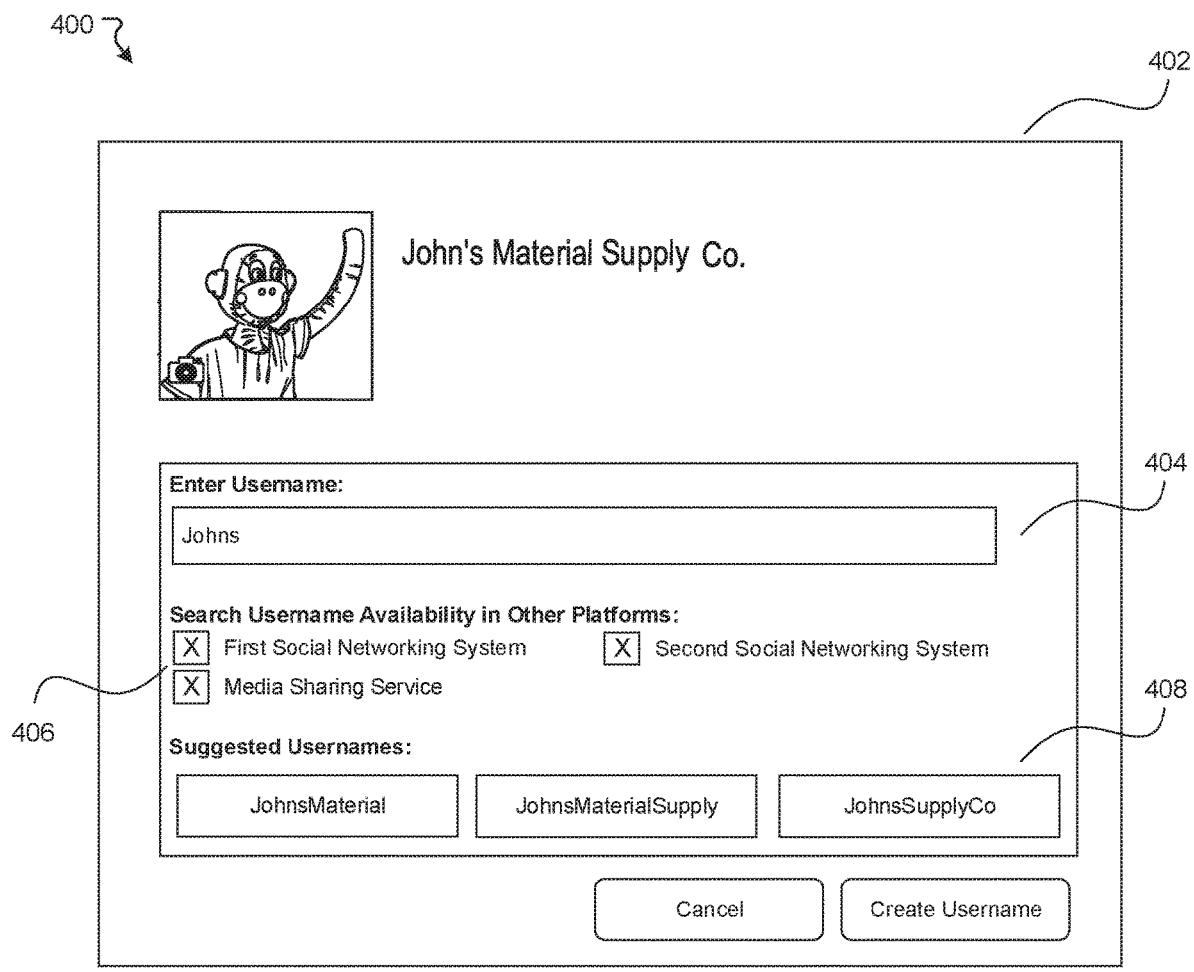
FIG. 4 illustrates an example diagram of an interface, according to an embodiment of the present disclosure.

FIG. 4 illustrates an example diagram 400 of an interface 402, according to an embodiment of the present disclosure. The interface 402 may be presented on a display screen of a computing device. Further, the interface 402 may be provided through an application (e.g., a social networking application) running on the computing device. The user operating the computing device can interact with the interface 402 to create an identifier (or username) for their page. In this example, the user can input a desired identifier into a field 404. In some embodiments, the interface 402 can include options 406 that allow the user to check the availability of the desired identifier on other platforms. In some embodiments, the interface 402 can present one or more suggested identifiers 408 that are available for use. These identifiers can be generated using any of the approaches described above.

Figure 5:
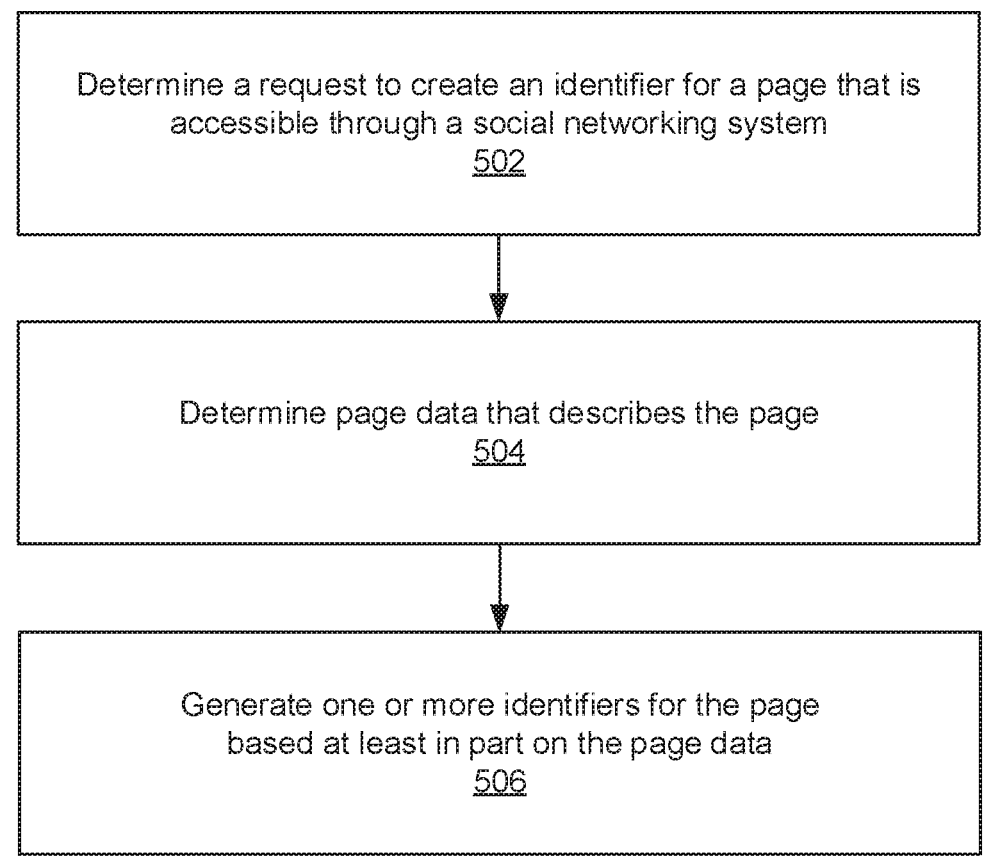
FIG. 5 illustrates an example process for generating page identifiers, according to various embodiments of the present disclosure.

FIG. 5 illustrates an example process for generating page identifiers, according to various embodiments of the present disclosure. It should be appreciated that there can be additional, fewer, or alternative steps performed in similar or alternative orders, or in parallel, within the scope of the various embodiments discussed herein unless otherwise stated. At block 502, a request to create an identifier for a page that is accessible through a social networking system is determined. At block 504, page data that describes the page is determined. At block 506, one or more identifiers for the page are generated based at least in part on the page data.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
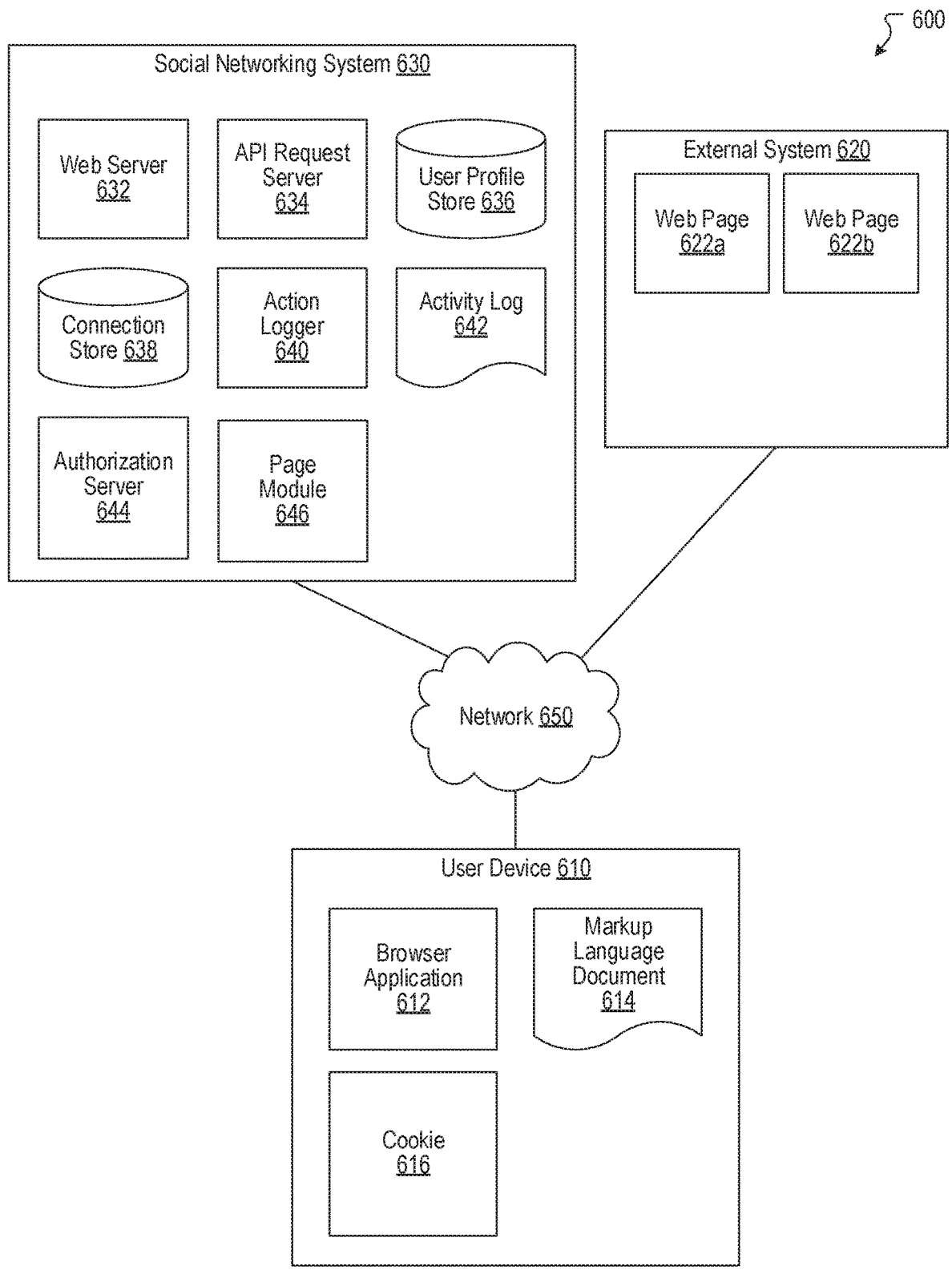
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page module 646. The page module 646 can, for example, be implemented as the page module 102 of FIG. 1. As discussed previously, it should be appreciated that there can be many variations or other possibilities.

Hardware Implementation

Figure 7:
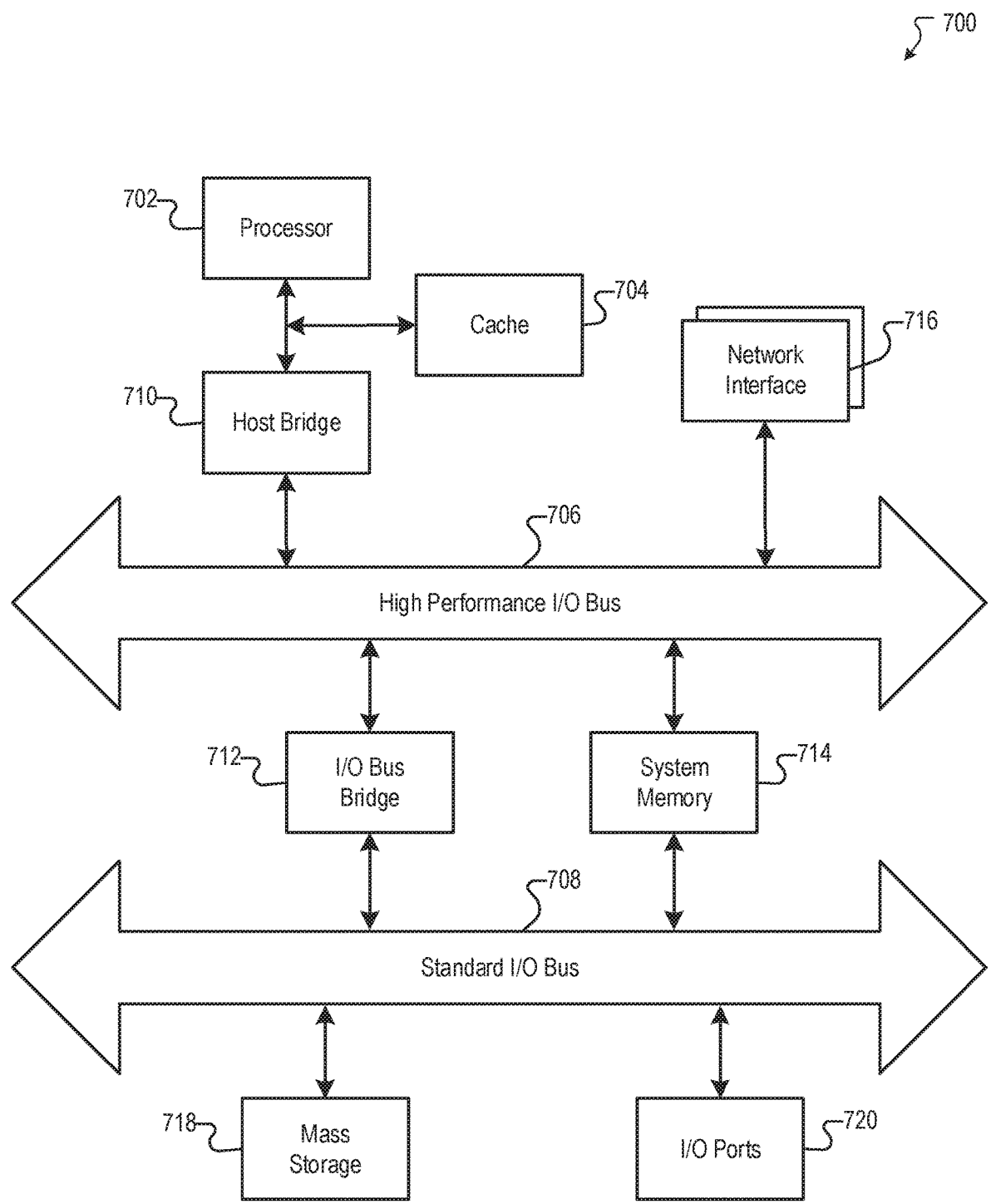
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a request to create an identifier for a page that is accessible through a social networking system, wherein the identifier for the page references the page in the social networking system;
    determining, by the computing system, page data that describes the page; and
    generating, by the computing system, one or more identifiers for the page based at least in part on the page data, the generating comprising:
        determining, by the computing system, that at least one of the identifiers for the page are available in one or more platforms other than the social networking system; and
        registering, by the computing system, at least one identifier that is available for the page in the social networking system and the one or more platforms other than the social networking system.

2. The computer-implemented method of claim 1, the method further comprising:
    providing, by the computing system, the one or more identifiers as suggestions to an administrator of the page.

3. The computer-implemented method of claim 1, wherein generating one or more identifiers for the page based at least in part on the page data further comprises:
    generating, by the computing system, at least one identifier for the page based at least in part on one or more categories associated with the page.

4. The computer-implemented method of claim 3, wherein at least one category associated with the page is determined automatically based at least in part on data describing content that was published in the page by users of the social networking system.

5. The computer-implemented method of claim 1, wherein generating one or more identifiers for the page based at least in part on the page data further comprises:
    generating, by the computing system, at least one identifier for the page based at least in part on one or more geographic locations associated with the page.

6. The computer-implemented method of claim 5, wherein a geographic location associated with the page is determined automatically based at least in part on respective geographic locations of users that liked the page.

7. The computer-implemented method of claim 5, wherein generating at least one identifier for the page based at least in part on one or more geographic locations associated with the page further comprises:
    generating, by the computing system, at least one identifier that includes a point of interest that is located within a threshold distance of a geographic location associated with the page.

8. The computer-implemented method of claim 5, wherein generating at least one identifier for the page based at least in part on one or more geographic locations associated with the page further comprises:
    generating, by the computing system, at least one identifier that includes at least a portion of a street address that corresponds to a geographic location associated with the page.

9. The computer-implemented method of claim 1, wherein generating one or more identifiers for the page based at least in part on the page data further comprises:
    determining, by the computing system, that the page corresponds to a first company branch of a plurality of company branches;
    obtaining, by the computing system, company data that references internal names for the company branches; and
    generating, by the computing system, at least one identifier for the page that includes a corresponding internal name for the first company branch.

10. A system comprising:
    at least one processor; and
    a memory storing instructions that, when executed by the at least one processor, cause the system to perform:
        determining a request to create an identifier for a page that is accessible through a social networking system, wherein the identifier for the page references the page in the social networking system;
        determining page data that describes the page; and
        generating one or more identifiers for the page based at least in part on the page data, the generating comprising:
            determining that at least one of the identifiers for the page are available in one or more platforms other than the social networking system; and
            registering at least one identifier that is available for the page in the social networking system and the one or more platforms other than the social networking system.

11. The system of claim 10, wherein the system further performs:
    providing the one or more identifiers as suggestions to an administrator of the page.

12. The system of claim 10, wherein generating one or more identifiers for the page based at least in part on the page data further causes the system to perform:
    generating at least one identifier for the page based at least in part on one or more categories associated with the page.

13. The system of claim 12, wherein at least one category associated with the page is determined automatically based at least in part on data describing content that was published in the page by users of the social networking system.

14. The system of claim 10, wherein generating one or more identifiers for the page based at least in part on the page data further causes the system to perform:
    generating at least one identifier for the page based at least in part on one or more geographic locations associated with the page.

15. A non-transitory computer-readable storage medium including instructions that, when executed by at least one processor of a computing system, cause the computing system to perform a method comprising:
    determining a request to create an identifier for a page that is accessible through a social networking system, wherein the identifier for the page references the page in the social networking system;

determining page data that describes the page; and generating one or more identifiers for the page based at least in part on the page data, the generating comprising:

determining that at least one of the identifiers for the page are available in one or more platforms other than the social networking system; and registering at least one identifier that is available for the page in the social networking system and the one or more platforms other than the social networking system.

16. The non-transitory computer-readable storage medium of claim 15, wherein the system further performs:

providing the one or more identifiers as suggestions to an administrator of the page.

17. The non-transitory computer-readable storage medium of claim 15, wherein generating one or more identifiers for the page based at least in part on the page data further causes the computing system to perform:

generating at least one identifier for the page based at least in part on one or more categories associated with the page.

18. The non-transitory computer-readable storage medium of claim 17, wherein at least one category associated with the page is determined automatically based at least in part on data describing content that was published in the page by users of the social networking system.

19. The non-transitory computer-readable storage medium of claim 15, wherein generating one or more identifiers for the page based at least in part on the page data further causes the computing system to perform:

generating at least one identifier for the page based at least in part on one or more geographic locations associated with the page.

* * * * *